(12) United States Patent
Shibata et al.

(10) Patent No.: US 12,178,219 B2
(45) Date of Patent: Dec. 31, 2024

(54) EDIBLE OIL/FAT COMPOSITION AND METHOD FOR PRODUCING SAME

(71) Applicant: FUJI OIL HOLDINGS INC., Osaka (JP)

(72) Inventors: Munehisa Shibata, Izumisano (JP); Takayasu Motoyama, Izumisano (JP)

(73) Assignee: FUJI OIL HOLDINGS INC., Osaka (JP)

( * ) Notice: Subject to any disclaimer, the term of this patent is extended or adjusted under 35 U.S.C. 154(b) by 637 days.

(21) Appl. No.: 17/422,306

(22) PCT Filed: Jan. 15, 2020

(86) PCT No.: PCT/JP2020/000989
§ 371 (c)(1),
(2) Date: Jul. 12, 2021

(87) PCT Pub. No.: WO2020/149287
PCT Pub. Date: Jul. 23, 2020

(65) Prior Publication Data
US 2022/0087279 A1    Mar. 24, 2022

(30) Foreign Application Priority Data
Jan. 16, 2019 (JP) .................. 2019-005341

(51) Int. Cl.
| A23L 27/21 | (2016.01) |
| A23D 7/005 | (2006.01) |
| A23D 9/007 | (2006.01) |
| A23D 9/04 | (2006.01) |
| A23G 1/36 | (2006.01) |
| A23G 1/44 | (2006.01) |
| A23L 27/22 | (2016.01) |

(52) U.S. Cl.
CPC ........... *A23D 9/007* (2013.01); *A23D 7/0053* (2013.01); *A23D 9/04* (2013.01); *A23G 1/36* (2013.01); *A23G 1/44* (2013.01); *A23L 27/22* (2016.08); *A23V 2002/00* (2013.01)

(58) Field of Classification Search
CPC .......... A23L 27/88; A23L 2/66; A23L 33/175; A23L 33/17; A23L 27/22; A23L 27/21; A23L 27/26; A23L 27/24
See application file for complete search history.

(56) References Cited

U.S. PATENT DOCUMENTS

| 5,206,220 A | 4/1993 | Hilton |
| 8,399,417 B2 | 3/2013 | Nagasaki et al. |
| 2010/0120698 A1 | 5/2010 | Nagasaki et al. |
| 2010/0183792 A1 | 7/2010 | Nagasaki et al. |
| 2012/0034364 A1 | 2/2012 | Futaki et al. |
| 2012/0277168 A1 | 11/2012 | Miyaki et al. |

FOREIGN PATENT DOCUMENTS

| AU | 2010339306 | 6/2012 | |
| CN | 101677621 | 3/2010 | |
| EP | 3 424 338 | 1/2019 | |
| EP | 3 425 033 | 1/2019 | |
| EP | 3 653 063 | 5/2020 | |
| JP | 60-9465 | 1/1985 | |
| JP | 2001-211880 | 8/2001 | |
| JP | 2007-45753 | 2/2007 | |
| JP | 2009-514791 | 4/2009 | |
| JP | 2016-19470 | 2/2016 | |
| JP | 2016-168044 | 9/2016 | |
| JP | 2016-185079 | 10/2016 | |
| JP | 2016-202118 | 12/2016 | |
| JP | 2017-6116 | 1/2017 | |
| JP | 2018-11537 | 1/2018 | |
| JP | 2018011537 A | * 1/2018 | ............. A23L 27/60 |
| WO | 2007/055393 | 5/2007 | |
| WO | 2008/139945 | 11/2008 | |
| WO | 2008/139946 | 11/2008 | |
| WO | 2010/114022 | 10/2010 | |
| WO | 2011/081185 | 7/2011 | |
| WO | 2011/081186 | 7/2011 | |
| WO | 2017/149701 | 9/2017 | |
| WO | 2018/079848 | 5/2018 | |

OTHER PUBLICATIONS

JP-2018011537-A, Honma R. et al., English Machine Translation, Jan. 25, 2018, filed on Jul. 20, 2016, pp. 1-6. (Year: 2018).*
Wu et al. "Composition of Free and Peptide-Bound Amino Acids in Beef Chuck, Loin, and Round Cuts" J.Anim.Sci. 2016, 94: 2603-2613. (Year: 2016).*
Extended European Search Report issued Sep. 1, 2022 in European Patent Application No. 20741376.6.
Roudot-Algaron, F. et al., "Dairy Foods Isolation of y-Glutamyl Peptides from Comté Cheese", Journal of Dairy Science, Jan. 1, 1993, vol. 77, No. 5, pp. 1161-1166.
Office Action issued Sep. 9, 2022 in corresponding Singaporean Application No. 11202107667P.
Office Action issued Jan. 20, 2023 in corresponding Chinese Patent Application No. 202080009408.9, with English-language translation.
Nishimura, Toshihide et al., ""Koku" Involved in Food Palatability; An Overview of Pioneering Work and Outstanding Questions", Chemistry and Biology, 2016, vol. 54, No. 2, pp. 1-25, with partial English-language translation.
International Search Report issued Apr. 7, 2020 in International (PCT) Application No. PCT/JP2020/000989.
Written Opinion of the International Searching Authority issued Apr. 7, 2020 in International (PCT) Application No. PCT/JP2020/000989.

(Continued)

*Primary Examiner* — Hong T Yoo
(74) *Attorney, Agent, or Firm* — Wenderoth, Lind & Ponack, L.L.P.

(57) ABSTRACT

To provide a method for improving the body taste-imparting effect of a γ-glutamyl peptide. By using an edible oil/fat composition that is produced by dispersing an aqueous solution of a γ-glutamyl peptide in an oil/fat, the body taste-imparting effect of the γ-glutamyl peptide is improved.

11 Claims, 1 Drawing Sheet

(56) References Cited

OTHER PUBLICATIONS

3rd Office Action issued Feb. 7, 2024 in corresponding Chinese Patent Application No. 202080009408.9, with English language translation.
Preparation of Leather Chemicals—Theory and Practice, 1st edition, P120, Jan. 2001, with English language translation.
Chinese Office Action dated Aug. 5, 2023 in Chinese Patent Application No. 202080009408.9, with English translation.
Office Action issued Oct. 8, 2024 in Japanese Patent Application No. 2020-566422, with English language translation.
Rejection Decision issued Apr. 11, 2024 in corresponding Chinese Patent Application No. 202080009408.9, with English language translation.

* cited by examiner

EDIBLE OIL/FAT COMPOSITION AND METHOD FOR PRODUCING SAME

RELATED APPLICATION

The present application claims the benefit of priority of application No. 2019-5341 filed to the Japan Patent Office on Jan. 16, 2019, said application is incorporated herein by reference in its entirety.

TECHNICAL FIELD

The present invention relates to an edible fat composition and a method for producing the same.

BACKGROUND ART

In general, deliciousness of food is said to be based on a balance of various factors such as taste, flavor, and texture. Among them, "taste" is one of the most important factors that determine the quality of food. And, it is widely recognized that the "taste" of food includes all kind of tastes including the five basic tastes expressed by sweetness, saltiness, acidity, bitterness, and umami.

Meanwhile, the use frequency of "koku" of foods that cannot be expressed only by the above five basic tastes has increased in recent years. "Koku" is defined as "taste which is generated from a lot, of stimuli related to taste, flavor, and texture (richness, complexity, thickness), and it is felt when these stimuli are well-balanced, filled and maintained in the mouth" (Non-Patent Document 1). "Taste" which fulfils this definition is called as "kokumi" and "kokumi means a taste that cannot be expressed with the five basic tastes, and means a taste that enhances not only the basic tastes but also marginal tastes of the basic tastes, such as thickness, growth (mouthfulness), persistence and harmony" (Patent Document 1).

The "kokumi" influences the deliciousness of the food. Deliciousness is added to a food by giving "kokumi" having a suitable strength for each food. Therefore, imparting/enhancing "kokumi" becomes one of the important points in making foods.

Glutathione (γ-Glu-Cys-Gly) has long been known as a substance that can impart "kokumi" to a food (Patent Document 2). In recent years, various γ-glutamyl peptides (Patent Document 1), γ-glutamyl-2-aminobutyric acid (γ-Glu-Abu) (Patent Document 3), γ-Glutamylnorvaline (γ-Glu-Nva) (patent document 4), and γ-glutamylnorvalylglycine (γ-Glu-Nva-Gly) (patent document 5) have been found by screening with using calcium receptor stimulating activity as an index.

Here, the taste changes with the lapse of time after eating, and is referred to as "initial taste", "middle taste", and "aftertaste" in order from immediately after eating. Among the above-mentioned various peptides, it is disclosed that γ-Glu-Abu and γ-Glu-Nva impart kokumi of the first taste, and γ-Glu-Nva-Gly imparts kokumi of the middle-after taste (Patent Documents 4 and 5).

Meanwhile, various γ-glutamyl peptides disclosed in Patent Document 1 having calcium receptor stimulating activity are said to improve the "body taste" of sweeteners by mixing with sweet substances (Patent Document 6). According to Patent Document 6, the "body taste" means that "the sweet substance has harmony and richness mainly in initial taste and middle taste when eating the sweet substance".

In addition, a technology for adding kokumi to food and beverage using γ-glutamyl peptide and fat (Patent Document 7) is disclosed, but this technology involves the addition of additional fat globules to food to which γ-glutamyl peptide has been added, and a fat composition containing γ-glutamyl peptide is not disclosed. Also disclosed is a technology for adding γ-glutamyl peptide to W/O/W emulsions to give kokumi to the W/O/W emulsions (Patent Document 8). However, Patent Document 9 only discloses an emulsion in which γ-glutamyl peptide is dissolved in the aqueous phase because it essentially discloses only the method of adding γ-glutamyl peptide to the emulsion, mayonnaise-like seasoning, and stirring it with a medicine spoon.

The above references and references listed herein are incorporated herein by reference.

PRIOR ART DOCUMENTS

Patent Documents

Patent Document 1: JP 2009-514791 A
Patent Document 2: JP S60-9465 A
Patent Document 3: WO 2010/114022 A
Patent Document 4: WO 2011/081185 A
Patent Document 5: WO 2011/081186 A
Patent Document 6: WO 2008/139946 A
Patent Document 7: JP 2016-168044 A
Patent Document 8: JP 2016-19470 A
Patent Document 9: JP 2001-211880 A
Patent Document 10: JP 2016-185079 A

Non-Patent Documents

Non-Patent Document 1: Toshihide Nishimura et. al., Chemistry and Biology, Vol. 54, No, 2, p 102-108 (2016)

SUMMARY OF INVENTION

Problems to be Solved by Invention

A variety of γ-glutamyl peptides have been found to enhance kokumi of food and beverage. However, a certain amount of γ-glutamyl peptide needs to be added to the food in order to impart sufficient kokumi to the food and beverage, which will inevitably increase the production cost. An object of the present invention is to enhance a kokumi-imparting effect of γ-glutamyl peptide and to provide a composition that may exhibit the kokumi-imparting effect even in small amounts.

Means for Solving Problems

The present inventors have intensively studied to solve the above problems. As a result, they have found that adding γ-glutamyl peptide in a state of an aqueous solution to fat and dispersing it in the fat to make edible oil composition enhances the kokumi-imparting effect of γ-glutamyl peptide. The present invention has been completed based on these findings.

That is, the present invention relates to:
(1) an edible fat composition containing γ-glutamyl peptide or salt thereof in a dispersed state;
(2) the edible fat composition of (1), where the γ-glutamyl peptide or salt thereof is one or two or more peptides having Z-(γ-Glu)$_n$-Y-(γ-Glu)$_m$-X—W, or salt thereof (where X is any amino acid or amino acid derivative, W, Y, and Z are each independently absent or any amino acid or amino acid derivative, n and m are each independently 0, 1, 2 or 3, and where n+m is 1 or more, the same shall apply hereinafter);
(3) the edible fat composition of (1), where the γ-glutamyl peptide or salt thereof is a peptide having a γ-glutamyl bond number of 1 to 4 and a peptide chain length of γ-glutamyl bond number +1 to +2, or salt thereof;
(4) the edible fat composition of (2), where the γ-glutamyl peptide or salt thereof is one or two or more peptides selected from the group consisting of a peptide consisting of γ-Glu-X, a peptide consisting of γ-Glu-γ-Glu-X, a peptide consisting of γ-Glu-γ-Glu-γ-Glu-X, and a peptide consisting of γ-Glu-γ-Glu-γ-Glu-γ-Glu-X, or salt thereof;
(5) the edible fat composition of (4), where X is selected from the group consisting of Tyr, Ala, Glu, Gln, Asp, Asn, Arg, His, Ile, Leu, Phe, Ser, and Val;
(6) a method for producing an edible fat composition, including preparing an aqueous solution of γ-glutamyl peptide or salt thereof, and dispersing the prepared aqueous solution in an edible fat;
(7) the method of (6), where the γ-glutamyl peptide or salt thereof is one or two or more peptides having Z-(γ-Glu)$_n$-Y-(Glu)$_m$-X—W, or salt thereof (where X is any amino acid or amino acid derivative, W, Y, and Z are each independently absent or any amino acid or amino acid derivative, n and m are each independently 0, 1, 2 or 3, and where n+m is 1 or more, the same shall apply hereinafter);
(8) the method of (6), where the γ-glutamyl peptide or salt thereof is a peptide having a γ-glutamyl bond number of 1 to 4 and a peptide chain length of γ-glutamyl bond number +1 to +2, or salt thereof;
(9) the method of (7), where the γ-glutamyl peptide or salt thereof is one or two or more peptides selected from the group consisting of a peptide consisting of γ-Glu-X, a peptide consisting of γ-Cu-γ-Glu-X, a peptide consisting of γ-Glu-γ-Glu-γ-Glu-X, and a peptide consisting of γ-Glu-γ-Glu-γ-Glu-γ-Glu-X, or salt thereof;
(10) the method of (9), where X is selected from the group consisting of Tyr, Ala, Glu, Gln, Asp, Asn, Arg, His, Ile, Leu, Phe, Ser, and Val;
(11) the method of any of (6) to (10), further including a step of dehydrating the edible fat after dispersing the aqueous solution in the edible fat;
(12) a method for producing a food or beverage, including adding the edible fat composition of any of (1) to (5) to the food or beverage, where kokumi is imparted to the food or beverage;
(13) an oily food including the edible fat composition of any of (1) to (5);
(14) a water in oil emulsified food including the edible fat composition of any of (1) to (5);
(15) a method for enhancing an effect of γ-glutamyl peptide or salt thereof imparting kokumi to a food or beverage, including preparing an aqueous solution of the γ-glutamyl peptide or salt thereof, and dispersing the aqueous solution in an edible fat.

Effect of Invention

The present invention enables to enhance the kokumi-imparting effect of γ-glutamyl peptide, and to impart kokumi to food and beverage with a smaller amount of γ-glutamyl peptide than simply adding it.

MODE FOR CARRYING OUT INVENTION

As used herein, the term "γ-glutamyl peptide" refers to a peptide that contains one or two or more γ-glutamyl bonds in the peptide. As used herein, the term "peptide" refers to a molecule in which approximately 2 to 50 amino acid residues are linked.

As used herein, the term "food and beverage" refers to any kind of food product, including beverage, and is also described simply as "food". In other words, the term "food" includes beverage, unless otherwise specified as "excluding beverage".

As used herein, the quantity ratio (concentration, etc.) is a ratio based on weight unless otherwise specified. That is, for example, "%" means "% by weight (w/w)" unless otherwise specified, and "ppm" means "ppm (w/w)" unless otherwise specified. In the present invention, the "concentration at the time of eating" of a certain component means the concentration of the component in the food when the food containing the component is eaten.

As used herein, the term "about." refers to a range of ±10%, preferably 5%. Numerical values that are the boundary values of the range are considered to be described herein.

As used herein, when a base, an amino acid, or the like is represented by an abbreviation, it is basically based on an abbreviation standardized by IUPAC or a common abbreviation in the field. Typical examples are shown below:
Gly: Glycine
Ala: Alanine
Val: Valine
Leu: Leucine
Ile: Isoleucine
Ser: Serine
Thr: Threonine
Cys: Cysteine
Met: Methionine
Glu: Glutamic acid
Asp: Aspartic acid
Lys: Lysine
Arg: Arginine
His: Histidine
Phe: Phenylalanine
Tyr: Tyrosine
Trp: Tryptophan
Pro: Proline
Asn: Asparagine
Gln: Glutamine
Orn: Ornithine
Sar: Sarcosine
Cit: Citruline
Nva: Norvaline
Nle: Norleucine
Abu: α-Aminobutyric acid
Tau: Taurine
Hyp: Hydroxyproline
Hue: Homoserine
t-Leu: tert-Leucine
Cle: Cycloleucine
Aib: α-Aminoisobutyric acid
Pen: Penicillamine
allo-Thr: Allothreonine
allo-Ile: Alloisoleucine
The amino acid derivative means various derivatives of the above amino acids, such as specialty amino acid, unnatural amino acid, amino alcohol, and amino acid in which terminal carbonyl group, amino group, or side chain, e.g. thiol groups of cysteine, is substituted by various substituents. The substituent includes alkyl group, acyl group, hydroxyl group, amino group, alkylamino group, nitro group, sulfonyl group, and various protective groups, and examples thereof include $Arg(NO_2)$: N-γ-nitroarginine, Cys (SNO): S-nitrocysteine, Cys (S-Me): S-methylcysteine, Cys (S-allyl): S-allylcysteine, Val-$NH_2$: valinamide, and Val-ol: valinol (2-amino-3-methyl-1-butanol).

As used herein, "γ-Glu-X" means that Glu and X are bonded via the carboxyl group at the γ-position of glutamic acid. Also, unless otherwise specified, "X" herein means any amino acid or amino acid derivative.

Figure 1:
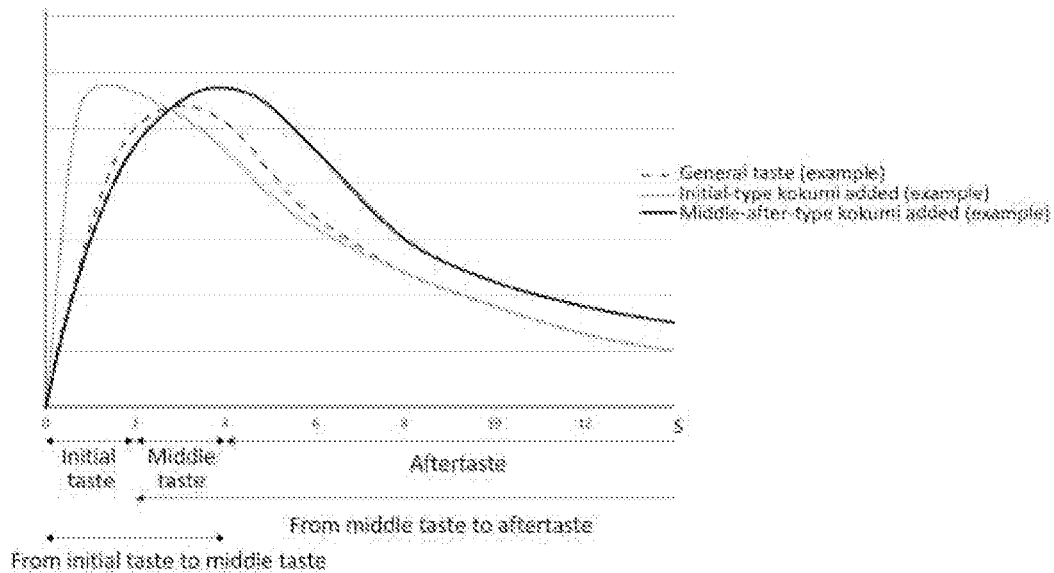
FIG. 1 It is a figure which represents a typical example of imparting kokumi to a food and beverage FIG. 2 It is a figure which represents a typical example of imparting a body taste to a food and beverage.
Figure 2:
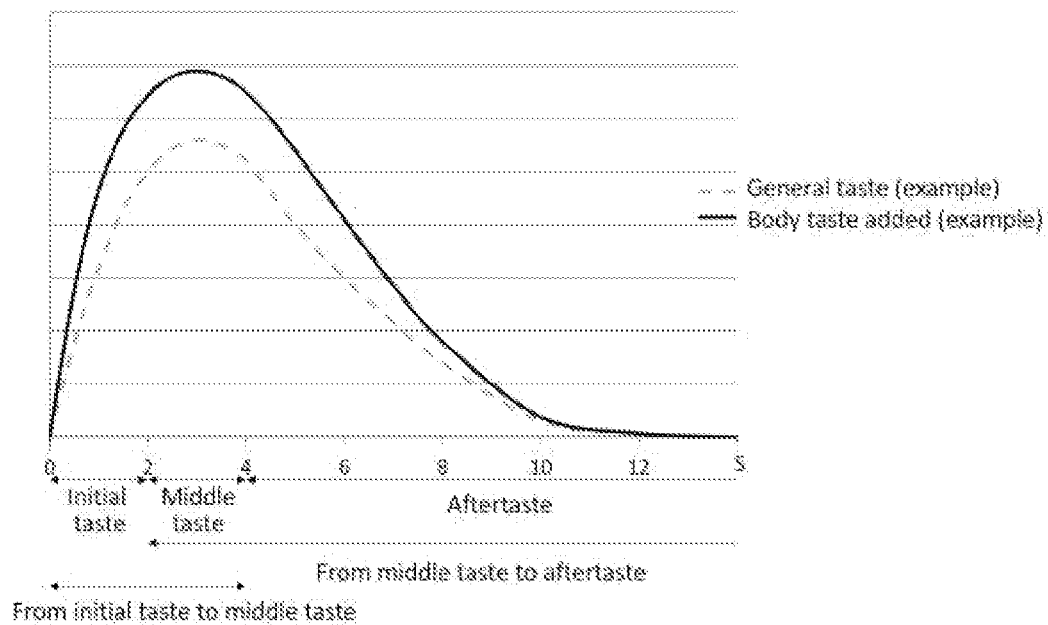

As used herein, "kokumi" means a taste that cannot be expressed with the five basic tastes, and means a taste that enhances not only the basic tastes but also marginal tastes of the basic tastes, such as thickness, growth, persistence and harmony. A typical example of imparting kokumi is shown in FIG. 1, but it is no, limited to this. In addition, imparting kokumi also includes adding a "body taste" which means that the substance has harmony and richness mainly in initial taste and middle taste when eating the substance. A typical example of giving a body taste is shown in FIG. 2, but it is not limited to this In one aspect, the present invention provides an edible fat composition containing γ-glutamyl peptide or salt thereof in a dispersed state.

The γ-glutamyl peptide used in the edible fat composition of this aspect is not particularly limited, but that imparts kokumi to food and beverage. Example of the γ-glutamyl peptide used in the edible fat composition of this aspect includes a peptide shown in the following formula:

$$Z\text{-}(γ\text{-Glu})_n\text{-}Y\text{-}(γ\text{-Glu})_m\text{-}X—W \quad (1)$$

Here, X represents any amino acid or amino acid derivative. And, W, Y, and Z are each independently absent or represent any amino acid or amino acid derivative. More specifically, the total number of W, X, Y, and Z (o) is 1, 2, 3, or 4. And, n and m are each independently 0, 1, 2 or 3, and n+m represents the number of γ-glutamyl bonds and is 1 or more. More specifically, n+m is 2 to 4. And, n+m+o represents the peptide chain length. More specifically, the peptide chain length is n+m+1, n+m+2, n+m+3 or n+m+4. More specific example includes a peptide shown in the following formula:

$$Z\text{-}(γ\text{-Glu})_n\text{-}X—Y \quad (2)$$

Here, X represents any amino acid or amino acid derivative, And, Y and Z are each independently absent or represent any amino acid or amino acid derivative. The total number of X, Y and Z (p) is 1, 2 or 3. And, n is 1, 2, 3, 4, 5 or 6 and represents the number of γ-glutamyl bonds. And, n+p indicates the peptide chain length and is n+1, n+2 or n+3. Further specific example includes a peptide shown in the following formula:

$$(γ\text{-Glu})_n\text{-}X—Y \quad (3)$$

Here, X represents any amino acid or amino acid derivative. And, Y is absent or represents any amino acid or amino acid derivative. And, n is 1, 2, 3, 4, 5 or 6 and represents the number of γ-glutamyl bonds. The peptide chain length is n+1 or n+2. Further more specific example includes a peptide shown in the following formula:

$$Z\text{-}(γ\text{-Glu})_n\text{-}Y\text{-}(γ\text{-Glu})_m\text{-}X \quad (4)$$

Here, X represents any amino acid or amino acid derivative. And, Y and Z are each independently absent or represent any amino acid or amino acid derivative. More specifically, the total number of X, Y and Z (p) is 1, 2 or 3. And, n and m are each independently 0, 1, 2 or 3, and n+m represents the number of γ-glutamyl bonds and is 1 or more. More specifically, n+m is 2 to 4. And, n+m+p represents the peptide chain length. More specifically, the peptide chain length is n+m+1, n+m+2 or n+m+3. Furthermore specific example includes a peptide shown in the following formula:

$$Z\text{-}(γ\text{-Glu})_n\text{-}X \quad (5)$$

Here, X represents any amino acid or amino acid derivative. And, Z is absent or represents any amino acid or amino acid derivative. And, n is 1, 2, 3, 4, 5 or 6 and represents the number of γ-glutamyl bonds. The peptide chain length is n+1 or n+2. Furthermore specific example includes a peptide shown in the following formula:

$$(γ\text{-Glu})_n\text{-}X \quad (6)$$

Here, X represents any amino acid or amino acid derivative. And, n is 1, 2, 3, 4, 5 or 6 and represents the number of γ-glutamyl bonds. The peptide chain length is n+1.

Specific example of γ-glutamyl peptides used in the edible fat composition includes γ-glutamyl peptide having the number of γ-glutamyl bonds of from 1 to 6, e.g., 1 to 5, 1 to 4, 1 to 3, 2 to 6, 2 to 5, 2 to 4 or 2 to 3, and the peptide chain length of from γ-glutamyl bonds+1 to +3, e.g., +1 to +2.

More specific examples of the γ-glutamyl peptide of the chemical formula (6) of this aspect include γ-Glu-X, γ-Glu-γ-Glu-X, γ-Glu-γ-Glu-γ-Glu-X, and γ-Glu-γ-Glu-γ-Glu-γ-Glu-X.

More specific examples of the γ-glutamyl peptide used in the edible fat composition of this aspect include γ-Glu-X (where X represents any amino acid or amino acid derivative), such as γ-Glu-Abu, γ-Glu-Nva, γ-Glu-Met, γ-Glu-Thr and γ-Glu-Val-$NH_2$, and γ-Glu-X—Y (where X and Y represents each independently any amino acid or amino acid derivative), such as γ-Glu-Cys-Gly, γ-Glu-Nva-Gly and γ-Glu-Val-Gly.

The amino acid or amino acid derivative represented by W, X, Y, and Z is not particularly limited, and includes any amino acid or amino acid derivative that may be used in a food. The amino acid and amino acid derivative may be any of D-form, L-form, and mixtures thereof, but is usually L-form. Specific examples of the amino acid include neutral amino acid such as Gly, Ala, Val, Leu, Ile, Ser. Thr, Cys, Met, Asn, Gin and Pro; acidic amino acid such as Asp and Glu; basic amino acid such as Lys, Arg and His; aromatic amino acids such as Phe, Tyr and Trp; Orn, Sar, Cit, Nva, Nle, Abu, Hyp, Hse and tert-Leu. In a certain embodiment, amino acid represented by W, X, Y, or Z is selected from the group consisting of Val, Leu, Ile, Ser, Thr, Cys, Met, Asp, Lys, Arg, His, Phe, Tyr, Trp, Pro, Asn, Orn, Cit, Nva, Nle, Abu, Hyp and Hse. In still another embodiment, amino acid represented by W, X, Y, or Z is selected from the group consists of Ile, Ser, Thr, Cys, Met, Asp, Lys, Arg, His, Trp, Pro, Asn, Orn, Cit, Nva, Nle, Abu, Hyp and Hse. Preferred examples of the amino acid include Tyr, Ala, Gly, Glu, Gln, Asp, Asn, Arg, His, Ile, Leu, Lys, Phe, Pro, Trp, Ser and Val. More preferred examples include Tyr, Ala, Glu, Gin, Asp, Arg, His, Ile, Leu, Phe, Ser and Val. More preferred examples include Tyr, Ala, Glu, Asp, Arg, His, Ile, Phe, Ser and Val. Further preferred examples include Tyr, Glu, Arg and His. Furthermore preferred examples include Tyr and Arg. One preferred example of the amino acid includes Tyr.

A method for obtaining and producing the γ-glutamyl peptide or salt thereof used in the edible tat composition of this aspect is not particularly limited, and a commercially available product may be used as long as it is commercially available. Alternatively, it may be produced by a method of chemical synthesis or a method using an enzymatic reaction.

Examples of the method of chemical synthesis of the γ-glutamyl peptide of this embodiment include a solid phase method using a peptide synthesizer, or a liquid phase method. Examples of the method of producing the γ-glutamyl peptide of this embodiment using an enzymatic reaction include a method using γ-glutamyl transpeptidase described in Patent Document 9 (JP 2001-211880 A). A commercially available enzyme having γ-glutamyl transpeptidase activity may also be used. In addition, as a kind of enzymatic reaction, it may be produced by culturing a microorganism capable of producing the component and recovering the desired component from the culture solution or cell. As a more specific example of the enzymatic reaction, the γ-glutamyl peptide of this embodiment may be obtained by reacting glutamine and a desired amino acid with γ-glutamyltranspeptidase.

The obtained peptide may be used as it is, or may be purified by a known method such as ion exchange chromatography, reverse phase high performance liquid chromatography and affinity chromatography. For example, a purified product having a peptide purity of 50% or more, 70% or more, 90% or more, or 95% or more may be used.

The γ-glutamyl peptide used in the edible fat composition of this aspect may be used in a free form or a salt form. The salt of the γ-glutamyl peptide of this embodiment may be any food-acceptable salt. For example, for acidic group such as carboxyl group, ammonium salt, salt with alkali metal such as sodium and potassium, salt with divalent metal such as magnesium and calcium, aluminum salt, zinc salt, salt with organic amine such as triethylamine, ethanolamines, morpholine, pyrrolidine, piperidine, piperazine and dicyclohexylamine, and salt with basic amino acid such as arginine and lysine. For basic group in the presence of basic group, salt with inorganic acid such as hydrochloric acid, sulfuric acid, phosphoric acid, nitric acid and hydrobromic acid, salt with organic carboxylic acid such as acetic acid, citric acid, benzoic acid, maleic acid, fumaric acid, tartaric acid, succinic acid, tannic acid, butyric acid, hybenzic acid, pamoic acid, enanthic acid, decanoic acid, teocric acid, salicylic acid, lactic acid, oxalic acid, mandelic acid and malic acid, and salt with organic sulfonic acid such as methanesulfonic acid, benzenesulfonic acid and p-toluenesulfonic acid.

These γ-glutamyl peptides may be used alone or in a mixture of two or more.

The edible fat composition of this aspect is typically a fat in which one or two or more γ-glutamyl peptides or salts thereof are dispersed. The dispersion refers to the fact that these γ-glutamyl peptides or salts thereof, which are hydrophilic and almost insoluble in fat, are dispersed in the fat. More specifically, the dispersion in this aspect means that neither precipitation of these γ-glutamyl peptides or salts thereof in the fat, nor floating it on the surface of the fat is observed visually. In a certain embodiment, the edible fat composition of this aspect may or may not be an emulsion. In a more specific embodiment, the edible fat composition of this aspect is not an emulsion.

Fat used as a raw material for the edible fat compositions of this aspect is not limited as long as it can be used for food. Specific examples of the fat include vegetable oil such as soybean oil, rapeseed oil, corn oil, cottonseed oil, peanut oil, sunflower oil, rice oil, safflower oil, olive oil, sesame oil, palm oil, coconut oil, and palm kernel oil; animal fat such as beef tallow, and lard; and processed fat thereof such as fractionated fat, hydrogenated fat, and interesterified fat; and mixed fat thereof. Preferred examples of the fat include rapeseed oil, corn oil, cottonseed oil, sunflower oil, palm oil, coconut oil, and palm kernel oil, and processed fat thereof.

A content of γ-glutamyl peptide or salt thereof contained in the fat composition of this aspect is not particularly limited, and may be determined by those skilled in the art depending on, for example, the type of γ-glutamyl peptide used, fat, and food and beverage. When the component of γ-glutamyl peptide forms a salt, the content of γ-glutamyl peptide is calculated by converting the mass of the salt into the mass of an equimolar free form. Examples of the content of γ-glutamyl peptide or salt thereof include about 0.001, 0.005, 0.01, 0.1, 0.2, 0.5, 1, 2, 5, 10, 15, 20, 25, 50, 75, 100, 150, 300, 500, 700, 900, 1500, and 2000 ppm. The content may be in any range with one of these values as the upper and lower limits.

The edible fat composition of this aspect may or may not contain food ingredients other than the fat, and γ-glutamyl peptide or salt thereof. Examples of such food ingredient include seasoning such as vinegar, miso, soy sauce and amino acid, acidulant, sweetener, bitter, spice, preservative, colorant, flavor, salt, sugar, fat, antioxidant, vitamin, stabilizer, thickener, and bulking agent.

A form of the edible fat composition of this aspect is not particularly limited, and may be various forms depending on the application. For example, it may be liquid, paste, cube, granule or powder.

In one embodiment, the edible fat composition of this aspect may be used as edible fat or food and beverage such as oily food, as is, mixed with other fat, and/or added with small amounts of other food ingredients. In another embodiment, the edible fat composition of this aspect may be used as an ingredient for food and beverage.

An adding amount of the edible fat composition of this aspect to food and beverage is not particularly limited, and may be determined by those skilled in the art depending on, for example, the type of fat and food and beverage. Examples of the adding amount include about 0-1, 0.2, 0.3, 0.5, 0.7, 1, 1.2, 1.5, 1.7, 2, 2.5, 3, 3.5, 4, 4.5, 5, 7, 9, 10, 12, 15, 20, 25, 30, 35, 40, 45, 50, 55, 60, 65, 70, 75, 80, 85, 90, 92, 95, 97, 98, 99, 100%, with respect to the food and beverage. The adding amount may be in any range with one of these values as the upper and lower limits.

A food and beverage to which the edible fat composition of this aspect is added is not particularly limited, and various foods and beverages and compositions that can be eaten and consumed are widely included. The food and beverage may be a natural product or a processed food that is not a natural product. Preferably, the food and beverage is a non-natural product. Examples of the food and beverage include beverage such as soft drink, fruit juice, milk beverage, soy milk beverage, tea beverage, alcoholic beverage, and soup; processed meat food such as ham, and sausage; fish processed food such as kamaboko (boiled fish paste), and chikuwa (a tube-shaped fish paste cake); edible fat such as deep-frying oil, salad oil, and seasoning oil; oil in water emulsified food such as butter, margarine, and fat spread; and dairy product such as fermented milk, and milk powder; confectionery or confectionery material such as chocolate, candy, gum, gummi, snack, cookie, whipped cream, custard cream, cake, pudding, jelly, bun, and dumpling; seasoning such as sauce, mayonnaise, ketchup, dressing, soy sauce, and ponzu sauce (citrus juice with vinegar); bread, and noodle. The edible fat composition of this aspect is particularly suitable for use in oily food containing fat, such as cooking fat, shortening, chocolate, and other oily food, and oil in water emulsified food such as butter, margarine, and fat sp-read because the edible fat composition of this aspect contain the fat as a major component.

In one aspect, the present invention provides a method for producing an edible fat composition, including preparing an aqueous solution of γ-glutamyl peptide or salt thereof, and dispersing the prepared aqueous solution in an edible fat.

The method of dispersing γ-glutamyl peptide or salt thereof in fat is not particularly limited, but includes preparing an aqueous solution of γ-glutamyl peptide or salt thereof, adding the prepared aqueous solution to the fat, and stirring. An equipment used for the stirring may be selected by those skilled in the art, and specific examples include high-speed stirrer, homomixer, homogenizer, and ultrasonic homogenizer. As a more specific dispersion method, for example, the method disclosed in Patent Document 10 (JP 2016-185079 A) may be used.

In this aspect, the aqueous solution of γ-glutamyl peptide or salt thereof may be prepared by dissolving a raw material containing γ-glutamyl peptide or salt thereof in a solvent such as water. Only the γ-glutamyl peptide or salt thereof may be dissolved. The aqueous solution may be prepared from chemically synthesized product or product produced using enzymatic reaction, or from crude or purified product of these products. If the chemically synthesized product or product produced using enzymatic reaction, or the crude or purified product is in the form of aqueous solution, it may be used as is or the concentration may be adjusted and used as an aqueous solution of γ-glutamyl peptide or salt thereof. The aqueous solution may be prepared after mixing the raw material containing γ-glutamyl peptide or salt thereof with a dispersant or other agent. Examples of the dispersant include sugar such as sucrose, lactose, oligosaccharide, dextrin, and cyclodextrin, and common salt. A ratio of raw material containing γ-glutamyl peptide or salt thereof to the dispersant is not particularly limited, and examples include 1:9, 2:8, 3:7, 4:6, 5:5, 6:4, 7:3, 8:2, and 9:1.

In this aspect, the solvent used to prepare the aqueous solution of γ-glutamyl peptide or salt thereof is not limited, and is typically water, and includes an aqueous media such as ethanol. In one embodiment, the solvent used is water. As used herein, the term "aqueous solution" includes solution containing aqueous media other than water, but preferably the water content is 90% or more, more preferably 95% or more, further preferably 98% or more, and further more preferably 99% or more. In more specific embodiment, the solvent in the term "aqueous solution" is all water. A concentration of γ-glutamyl peptide or salt thereof in the aqueous solution is not particularly limited and may be adjusted by those skilled in the art. Specific Examples of the concentration include about 1 to 60%, about 5 to 55%, about 10 to 50%, about 15 to 45%, about 2 to 30%, about 3 to 20%, and about 4 to 15%.

In this aspect, an amount of the aqueous solution added to the fat is not particularly limited, and may be determined by those skilled in the art. Examples of the amount of the aqueous solution to be added to the fat include about 0.001% to 5%, about 10 to 10000 ppm, about 50 to 5000 ppm, about 100 to 1000 ppm, and about 250 to 750 ppm.

Tn this aspect, a temperature at which the γ-glutamyl peptide or salt thereof is added to the fat is not particularly limited. In one embodiment, the aqueous solution is added to the heated fat. Examples of the preferred temperature include about 40 to 200° C., about 50 to 180° C., about 55 to 150° C., about 60 to 100° C., and about 65 to 80° C.

In this aspect, an emulsifier such as polyglycerol fatty acid ester, sucrose fatty acid ester, organic acid monoglyceride, and lecithin may or may not be added as necessary before, simultaneously with, or after the addition of γ-glutamyl peptide or salt thereof to the fat. An amount of the emulsifier added to the edible fat composition is preferably 5% or less, more preferably 3% or less, further preferably 1% or less, and further more preferably 0.1% or less. The lower limit is not particularly limited, but the examples include 0.001% or more, and 0.01% or more.

In this aspect, other food ingredients, for example, seasoning such as vinegar, miso, soy sauce and amino acid, acidulant, sweetener, bitter, spice, preservative, colorant, flavor, salt, sugar, fat, antioxidant, vitamin, stabilizer, thickener, and bulking agent, may or may not be added. A timing of adding them is not particularly limited, for example, before, simultaneously with, or after the addition of γ-glutamyl peptide or salt thereof to the fat.

In this aspect, dehydration treatment may or may not be performed after the aqueous solution of γ-glutamyl peptide or salt thereof is added and dispersed to the fat. Examples of the dehydration treatment include decompression, distribution, evaporation, and dehydration with water absorbent. For example, in the case of decompression, the conditions may be set by those skilled in the art, such as 0.5 to 100 Torr. In one embodiment, a water content of the edible fat composition is preferably 1% or less, preferably 0.5% or less, more preferably 0.25% or less, and further preferably 0.1% or less. The lower limit of the water content is not particularly limited, and the examples include 0.0001% or more, 0.001% or more, 0.002% or more, 0.005% or more, and 0.01% or more. In one specific embodiment, the amount of aqueous medium, including water and ethanol, in the edible fat composition is preferably 1% or less, preferably 0.5% or less, more preferably 0.25% or less, and further preferably 0.1% or less. The lower limit of the amount of aqueous medium is not particularly limited, and the examples include 0.0001% or more, 0.001% or more, 0.002% or more, 0.005% or more, and 0.01% or more. In one embodiment, the edible fat composition of this aspect may or may not be an emulsion. In more specific embodiment, the edible fat composition in this aspect is not an emulsion. In one particular embodiment, the dehydration treatment is carried out until, emulsion is not formed.

In this aspect, the obtained edible fat composition may be used as is, or it may be processed into various forms such as paste, powder, and cube. Examples of a method of preparing powderized fat composition include a spray cooling method of spraying a dissolved fat into a cooling tower (chiller), followed by powderization, and a drum flake method of flowing a dissolved fat on a cooled drum, solidifying the fat, and scraping the resultant.

In another aspect, the present invention provides a method for enhancing an effect of γ-glutamyl peptide or salt thereof imparting kokumi to a food and beverage, including preparing an aqueous solution of the γ-glutamyl peptide or salt thereof, and dispersing the aqueous solution in an edible fat All of the above descriptions for the edible fat composition and the method for producing the edible fat composition are applied to this aspect.

In this aspect, the kokumi-imparting effect of γ-glutamyl peptide by using γ-glutamyl peptide or salt thereof in the form of the edible fat composition may be at least 5, 10, 20, 50, 100, 150, 200, 250, 300, 350, or 400 times greater than the case of adding γ-glutamyl peptide or salt thereof as is.

In a further aspect, the present invention provides a food and beverage containing the above edible fat composition, a method for producing the food and beverage, and a method for imparting kokumi to a food and beverage, including using γ-glutamyl peptide or salt thereof as a form of edible fat composition.

All. of the above descriptions for the edible fat composition and the method for producing the edible fat composition are applied to this aspect.

EXAMPLES

Hereinafter, more specific embodiments of the present invention will be described by way of Examples.

Example 1. Study with γ-Glutamyl Peptides Mixed Powder

1. Preparation of γ-Glutamyl Peptide Sample

As a peptide sample, a peptide powder was prepared by mixing γ-Glu-Tyr (Bachem AG), γ-Glu-γ-Glu-Tyr (consignment synthetic product), and γ-Glu-γ-Glu-γ-Glu-Tyr (consignment synthetic product) in a 1:1:1 ratio. This powder was mixed with maltooligosaccharide powder at a ratio of 2:8 to form the sample (γ-glutamyl peptide concentration: about 8%).

2. Dispersion of γ-Glutamyl Peptide Sample in Fat

A distilled water was added to the sample obtained above to prepare 50% sample solution. Vegetable fat was heated to 70° C., and the sample solution was added and dispersed while stirring with a homomixer to prepare an edible fat composition. (γ-Glutamyl peptide concentration: about 20 ppm)

3. Addition of Edible Fat Composition to Food

The edible fat composition obtained above was added to milk chocolate at 5% (γ-glutamyl peptide concentration: about 1 ppm). Milk chocolate prepared by adding ordinary fat instead of the edible fat composition was used as a control, and milk chocolate prepared by adding the edible fat composition was evaluated by seven trained panelists using a seven-point evaluation method with the control receiving four points. The results are shown in Table 1.

TABLE 1

| Panelist | Score |
| --- | --- |
| A | 5 |
| B | 6 |
| C | 5 |
| D | 5 |
| E | 7 |
| F | 6 |
| G | 6 |
| Average | 5.7 |

As shown in Table 1, the addition of the edible fat composition significantly added kokumi to the chocolate, even at a very low concentration of γ-glutamyl peptide of about 1 ppm. A milky feeling and cocoa feeling were also enhanced.

4. Confirmation of the Degree of Enhancement of Kokumi-Imparting Effect

The γ-glutamyl peptide sample was added to milk chocolate without being dispersed in fat at the concentrations shown in Table 2, and milk chocolates were prepared in an isometric concentration series where the concentration of the sample added increased by 1.3 times.

TABLE 2

| Series | No. 1 | No. 2 | No. 3 | No. 4 | No. 5 | No. 6 | No. 7 |
| --- | --- | --- | --- | --- | --- | --- | --- |
| Sample concentration (%) | 0.1 | 0.13 | 0.17 | 0.22 | 0.29 | 0.37 | 0.48 |
| γ-glutamyl peptide concentration (ppm) | 80 | 104 | 136 | 176 | 232 | 296 | 384 |

Seven trained panelists evaluated the degree of kokumi of the milk chocolate (γ-glutamyl peptide concentration: about 1 ppm) prepared in the above 2, to select which of the above Nos. 1 to 7 corresponded. The results are shown in Table 3.

TABLE 3

| Panelist | Selected No. | γ-glutamyl peptide concentration |
| --- | --- | --- |
| A | 6 | 296 |
| B | 5 | 232 |
| C | 5 | 232 |
| D | 4 | 176 |
| E | 6 | 296 |
| F | 6 | 296 |
| G | 5 | 232 |
| Average | | 251.4 |

As shown in Table 3, the chocolate prepared by adding γ-glutamyl peptide as the edible fat composition was about 250 times more effective in kokumi-imparting effect than chocolate prepared by adding γ-glutamyl peptide without preparing an edible fat composition.

Example 2. Study with Other Peptide Samples

Fat compositions prepared by using each peptide samples used in Example 1 without mixing, γ-Glu-Tyr (Bachem AG), γ-Glu-γ-Glu-Tyr (consignment synthetic product), and γ-Glu-γ-Glu-γ-Glu-Tyr (consignment synthetic product), as well as fat compositions prepared by using γ-Glu-Cys-Gly, and γ-Glu-Val-Gly instead of the peptide samples described above, similarly added kokumi to the chocolate.

Example 3. Study with Margarine

The edible fat composition obtained in Example 1 was added to commercially available margarine at 5%. As a result of evaluation in the same manner as in Example 1, it added a significantly higher kokumi than margarine prepared by adding ordinary fat.

The present invention enables to improve the kokumi-imparting effect of γ-glutamyl peptide. The edible fat composition of the present invention may be used in the fields of food, seasoning, functional food, and food service industry.

The invention claimed is:

1. An edible fat composition comprising a fat and a γ-glutamyl peptide or salt thereof in a dispersed state,
   wherein the γ-glutamyl peptide or salt thereof is at least one peptide of the following formula: Z-(γ-Glu)$_n$-Y-(γ-Glu)$_m$-X—W, or salt thereof,
   wherein:
   X is an amino acid or an amino acid derivative,
   W, Y, and Z are each independently absent or an amino acid or an amino acid derivative,
   n and m are each independently 0, 1, 2 or 3, wherein n+m is 1 or more, and
   X is selected from the group consisting of Tyr, Ala, Glu, Gln, Asp, Asn, Arg, His, Ile, Leu, Phe, Ser, and Val.

2. The edible fat composition according to claim 1, wherein the γ-glutamyl peptide or salt thereof is a peptide having a γ-glutamyl bond number of 1 to 4 and a peptide chain length of γ-glutamyl bond number +1 to +2, or salt thereof.

3. The edible fat composition according to claim 1,
wherein the γ-glutamyl peptide or salt thereof is at least one peptide having a formula selected from the group consisting of γ-Glu-X, γ-Glu-γ-Glu-X, γ-Glu-γ-Glu-γ-Glu-X, and γ-Glu-γ-Glu-γ-Glu-γ-Glu-X,
wherein X is selected from the group consisting of Tyr, Ala, Glu, Gln, Asp, Asn, Arg, His, Ile, Leu, Phe, Ser, and Val,
or salt thereof.

4. A method for producing an edible fat composition comprising a fat and a γ-glutamyl peptide or salt thereof in a dispersed state,
the method comprising preparing an aqueous solution of γ-glutamyl peptide or salt thereof, and dispersing the prepared aqueous solution in an edible fat,
wherein the γ-glutamyl peptide or salt thereof is at least one peptide of the following formula: Z-(γ-Glu)$_n$-Y-(γ-Glu)$_m$-X—W, or salt thereof,
wherein:
X is an amino acid or an amino acid derivative,
W, Y, and Z are each independently absent or an amino acid or an amino acid derivative,
n and m are each independently 0, 1, 2 or 3, wherein n+m is 1 or more, and
X is selected from the group consisting of Tyr, Ala, Glu, Gln, Asp, Asn, Arg, His, Ile, Leu, Phe, Ser, and Val.

5. The method according to claim 4, wherein the γ-glutamyl peptide or salt thereof is a peptide having a γ-glutamyl bond number of 1 to 4 and a peptide chain length of γ-glutamyl bond number +1 to +2, or salt thereof.

6. The method according to claim 4,
wherein the γ-glutamyl peptide or salt thereof is at least one peptide having a formula selected from the group consisting of γ-Glu-X, γ-Glu-γ-Glu-X, γ-Glu-γ-Glu-γ-Glu-X, and γ-Glu-γ-Glu-γ-Glu-γ-Glu-X,
wherein X is selected from the group consisting of Tyr, Ala, Glu, Gln, Asp, Asn, Arg, His, Ile, Leu, Phe, Ser, and Val,
or salt thereof.

7. The method according to claim 4, further comprising a step of dehydrating the edible fat after dispersing the aqueous solution in the edible fat.

8. A method for producing a food or beverage, comprising adding the edible fat composition according to claim 1 to the food or beverage, wherein kokumi is imparted to the food or beverage.

9. An oily food comprising the edible fat composition according to claim 1.

10. A water in oil emulsified food comprising the edible fat composition according to claim 1.

11. A method for enhancing an effect of γ-glutamyl peptide or salt thereof imparting kokumi to a food or beverage, comprising preparing an aqueous solution of the γ-glutamyl peptide or salt thereof, and dispersing the aqueous solution in an edible fat,
wherein the γ-glutamyl peptide or salt thereof is at least one peptide of the following formula: Z-(γ-Glu)$_n$-Y-(γ-Glu)$_m$-X—W, or salt thereof,
wherein:
X is an amino acid or an amino acid derivative,
W, Y, and Z are each independently absent or an amino acid or an amino acid derivative,
n and m are each independently 0, 1, 2 or 3, wherein n+m is 1 or more, and
X is selected from the group consisting of Tyr, Ala, Glu, Gln, Asp, Asn, Arg, His, Ile, Leu, Phe, Ser, and Val.

\* \* \* \* \*